United States Patent
Boettger et al.

(10) Patent No.: US 9,466,116 B2
(45) Date of Patent: Oct. 11, 2016

(54) METHOD AND SYSTEM FOR SEPARATING TISSUE CLASSES IN MAGNETIC RESONANCE IMAGES

(75) Inventors: Thomas Boettger, Heidelberg (DE); Dominique Toepfer, Markranstädt (DE)

(73) Assignee: Siemens Aktiengesellschaft, München (DE)

( * ) Notice: Subject to any disclaimer, the term of this patent is extended or adjusted under 35 U.S.C. 154(b) by 984 days.

(21) Appl. No.: 13/088,171

(22) Filed: Apr. 15, 2011

(65) Prior Publication Data

US 2012/0263361 A1    Oct. 18, 2012

(51) Int. Cl.
*G06T 7/00*        (2006.01)
*G06K 9/62*       (2006.01)

(52) U.S. Cl.
CPC ........... *G06T 7/0081* (2013.01); *G06T 7/0012* (2013.01); *G06K 9/6218* (2013.01); *G06T 2207/10088* (2013.01); *G06T 2207/20081* (2013.01); *G06T 2207/30016* (2013.01)

(58) Field of Classification Search
CPC ............... G06T 7/0012; G06T 7/0081; G06T 2207/20148; G06K 9/6218; G06K 9/6226
USPC .......................... 382/131, 128, 132, 171, 225
See application file for complete search history.

(56) References Cited

U.S. PATENT DOCUMENTS

| | | | |
|---|---|---|---|
| 5,412,563 A * | 5/1995 | Cline et al. | 345/420 |
| 7,636,420 B2 * | 12/2009 | Spies | A61N 5/1039 378/108 |
| 2001/0031920 A1 * | 10/2001 | Kaufman et al. | 600/431 |
| 2004/0013292 A1 * | 1/2004 | Raunig | 382/128 |
| 2008/0132787 A1 * | 6/2008 | Putaala | A61N 5/103 600/439 |
| 2010/0124364 A1 * | 5/2010 | Huo et al. | 382/128 |
| 2010/0198900 A1 * | 8/2010 | Gifford | 708/401 |
| 2011/0002523 A1 * | 1/2011 | Prakash et al. | 382/131 |
| 2012/0075440 A1 * | 3/2012 | Ahuja et al. | 348/61 |

OTHER PUBLICATIONS

Toepfer et al. "Classification of UTE-MR volumes of the head for use in radiotherapy planning," Oncology Care Systems, Healthcare Sector, Siemens AG, Germany, pp. 1-5, 2003.*
Kapur, et al. "Segmentation of brain tissue from magnetic resonance images." Medical Image Analysis. 1.2 (1996): 109-127. Print.*
Crum, William R. "Spectral Clustering and Label Fusion for 3D Tissue Classification: Sensitivity and Consistency Analysis." Annals of BMVA. 2009.6 (2009): 1-12. Print.*

(Continued)

*Primary Examiner* — Michael A Newman
(74) *Attorney, Agent, or Firm* — Lempia Summerfield Katz LLC

(57) ABSTRACT

A method for separating tissue classes in MR images is presented. The method includes acquiring a plurality of magnetic resonance images of a subject with different acquisition parameters and generating a multi-dimensional intensity distribution model from the plurality of magnetic resonance images. The multi-dimensional intensity distribution model represents a distribution of intensities of voxels in each magnetic resonance image of the plurality. The method also includes identifying clusters of correlated intensities in the multi-dimensional intensity distribution model and assigning the clusters into one or more tissue classes based on the correlated intensities of each of the cluster.

19 Claims, 2 Drawing Sheets

(56) References Cited

OTHER PUBLICATIONS

Mackiewich, Blair. "7.5 Correct Intensity." Simon Fraser University Computing Science. N.p., Aug. 19, 1995. Web. Jun. 7, 2014. <http://www.cs.sfu.ca/~stella/papers/blairthesis/main/node45.html>.*

Ferrari, et al. "Segmentation of the fibro-glandular disc in mammograms using Gaussian mixture modeling." Medical & Biological Engineering & Computing. 42. (2004): 378-387. Print.*

Shah, et al. "Effectiveness of Intensity Normalization on Human Brain MRIs with Multiple Sclerosis." MIAMS—Workshop on Medical Image Analysis on Multiple Sclerosis. (2009): 1-12. Print.*

Dawant, et al. "Correction of Intensity Variations in MR Images for Computer-Aided Tissue Classification." IEEE Transactions on Medical Imaging. 12.4 (1993): 770-781. Print.*

Jager, et al. "Nonridig Registration of Joint Histograms for Intensity Standardization in Magnetic Resonance Imaging." IEEE Transactions on Medical Imaging. 28.1 (2009): 137-150. Print.*

Jacobs et al. "A Model for Multiparametric MRI Tissue Characterization in Experimental Cerebral Ischemia With Histological Validation in Rat Part 1." Stroke: Journal of the American Heart Association. 32. (2001): 943-949. Print.*

Greenspan et al. "Constrained Gaussian Mixture Model Framework for Automatic Segmentation of MR Brain Images." IEEE Transactions on Medical Imaging. 25.9 (2006): 1233-1245. Print.*

Robson et al. "Magnetic Resonance: An Introduction to Ultrashort TE (UTE) Imaging." J Comput Assist Tomogr. 27.6 (2003): 825-846. Print.*

Huang et al. "MRI Brain Extraction with Combined Expectation Maximization and Geodesic Active Contours." IEEE International Symposium on Signal Processing and Information Technology. (2006): 107-111. Print.*

Mackiewich et al. "7.5 Correct Intensity." Simon Fraser University Computing Science. N.p., Aug. 19, 1995. Web. Jun. 7, 2014. <http://www.cs.sfu.ca/~stella/papers/blairthesis/main/node45.html>.*

Jonsson, et al. "Treatment Planning Using MRI Data: An Analysis of the Dose Calculation Accuracy for Different Treatment Regions." Radiation Oncology 5.62 (2010): 1-8. Print.*

Prastawa, et al. "A Brain Tumor Segmentation Framework Based on Outlier Detection." Medical Image Analysis 8 (2004): 275-83. Print.*

Dominique Toepfer et al., "Classification of UTE-MR volumes of the head for use in radiotherapy planning," Oncology Care Systems, Healthcare Sector, Siemens AG, Germany, pp. 1-5, 2003.

Abstract, "Classification of UTE-MR volumes of the head for use in radiotherapy planning," p. 1, Jul. 2010.

* cited by examiner

METHOD AND SYSTEM FOR SEPARATING TISSUE CLASSES IN MAGNETIC RESONANCE IMAGES

FIELD

The present embodiments relate to a method and system for separating tissue classes in magnetic resonance images.

BACKGROUND

Radiation therapy is the medical use of ionizing radiation as a part of cancer treatment to control malignant cells and may be used as a primary or adjuvant modality. Radiation therapy (RT) planning may be based on computed tomography (CT) images. CT images provide the electron density information for dose calculation, which may be obtained almost directly and hence, is used for RT planning.

In some cases, however, the use of CT images poses difficulties in RT planning. The presence of implants in the body of a patient, for example, may cause image artifacts. Magnetic resonance (MR) images may be used in RT planning for delineation of a tumor and organs at risk, due to better soft tissue contrast. The RT planning may be achieved by manual segmentation or atlas based segmentation of MR images. Also, techniques such as generating a statistical model from CT images and fitting into MR images are present. These techniques fail to classify different tissues in the body of the patient (e.g., in the head). Other techniques such as fitting a statistical model obtained from the CT images to the MR images are unable to map the individual skull shape correctly.

SUMMARY

It is desirable to develop a technique, which may be used for RT planning, that may separate tissues in an MR image. It is also desirable to develop a system to implement the method from the MR images.

In one embodiment, a method for separating tissue classes in MR images is provided. The method includes acquiring a plurality of magnetic resonance images of a subject with different acquisition parameters and generating a multi-dimensional intensity distribution model from the plurality of magnetic resonance images. The multi-dimensional intensity distribution model represents a distribution of intensities of voxels in each magnetic resonance image of the plurality, identifying clusters of correlated intensities in the multi-dimensional intensity model and assigning the clusters into one or more tissue classes based on the correlated intensities of each of the clusters.

In another embodiment, a system for separating tissue classes in magnetic resonance images is provided. The system includes a processor configured to acquire a plurality of magnetic resonance images of a subject with different acquisition parameters and generate a multi-dimensional intensity distribution model from the plurality of magnetic resonance images. The multi-dimensional intensity distribution model represents a distribution of intensities of voxels in each magnetic resonance image of the plurality. The processor is also configured to identify clusters of correlated intensities in the multi-dimensional intensity distribution model and assign the clusters into one or more tissue classes based on the correlated intensities of each of the clusters.

In yet another embodiment, a non-transitory computer readable medium is provided. The non-transitory computer readable medium includes instructions that, when executed by a processor, causes the processor to perform a method including acquiring a plurality of magnetic resonance images of a subject with different acquisition parameters and generating a multi-dimensional intensity distribution model from the plurality of magnetic resonance images. The multi-dimensional intensity distribution model represents a distribution of intensities of voxels in each magnetic resonance image of the plurality. The method also includes identifying clusters of correlated intensities in the multi-dimensional intensity model and assigning the clusters into one or more tissue classes based on the correlated intensities of each of the clusters.

DETAILED DESCRIPTION OF THE DRAWINGS

Figure 1:
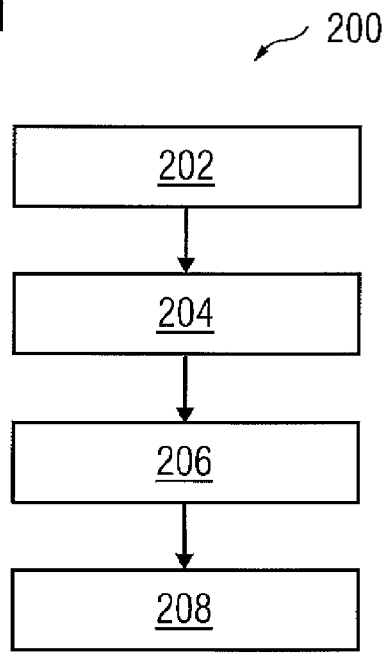
FIG. 1 is a flowchart illustrating one embodiment of a method of separating tissue classes in magnetic resonance images.

FIG. 1 is a flowchart 200 that illustrates one embodiment of a method for separating tissue classes in magnetic resonance images. An MR imaging system operable to scan a subject and generate an image of the subject (e.g., a patient) is used to achieve the exemplary method. Although, the exemplary embodiments illustrated are described in the context of imaging a head of the patient, the embodiments may also include other parts of the body of the patient. The exemplary embodiments illustrated and described hereinafter may find application in multi-modality imaging systems that employ an imaging system in conjunction with other imaging modalities, position-tracking systems or other sensor systems.

The MR imaging system may generate ultra short echo time (UTE) pulse sequences that may be used for imaging tissues or tissue components.

At act 202, a plurality of MR images of the subject is acquired with different acquisition parameters. The different acquisition parameters may include parameters such as, for example, imaging parameters, repetition time, echo time, sampling bandwidth, scanning time and scanning range. In accordance with aspects of the present technique, the MR images are acquired using the UTE technique having different echo time (TE). In one embodiment, two images having different echo time are acquired such that a first image of the two images is acquired using smaller echo time, and a second image of the two images is acquired with a longer echo time compared to the first image. As an example, the first image is acquired using an ultra short TE of 0.07 ms, and the second image is acquired using an ultra short TE of about 2-5 ms. Use of different echo time enables acquiring images with different tissues in the body of the patient highlighted in the corresponding images.

The head of the patient may include several tissues. The tissues may include bone, air, and cerebrospinal fluid and soft tissues such as tendons, ligaments, fascia, skin, fibrous tissue, and fat, for example.

At act 204, a multi-dimensional intensity distribution model is generated from the plurality of MR images. The multi-dimensional intensity distribution model represents a distribution of intensities of voxels in each magnetic resonance image of the plurality. The MR images are three-dimensional images that include volume elements (e.g., voxels). The voxels in each image of the plurality have different intensity values. The multi-dimensional intensity distribution model will be described in more detail with reference to FIG. 3.

The multi-dimensional intensity distribution model may be a Gaussian mixture model (GMM). Other techniques such as, for example, K-means classification, neural networks, and support vector machines may also be used for classification of the multi-dimensional intensity distribution model. A GMM is a parametric probability density function represented as a weighted sum of Gaussian component densities. GMM is used as a parametric model of the probability distribution of continuous measurements such as, for example, the intensity distribution of voxels in each MR image of the plurality.

At act 206, clusters in the multi-dimensional intensity distribution model are identified. The clusters are representative of correlated intensities of voxels from each MR image of the plurality. One or more clusters may thus be identified in the multi-dimensional intensity distribution model, where the one or more clusters are indicative of different tissue classes in the head of the patient.

An image may be represented as a grid of matrix M×N, where M and N are natural or integer numbers. Each of these values represents a microdot or a pixel specifying a location of the pixel. The pixel may be represented by a grey value having a value from 0 to 255 (e.g., grey levels with value 0 as black and 255 as white), thus indicating the intensity of the pixel. The two images have intensity values that may be different for each of the pixels or the picture elements. The terms "pixel" and "voxel" are used interchangeably throughout the application.

In one embodiment, the identification of the clusters includes allocating a point in the multi-dimensional intensity distribution model to one of the clusters, such that a distance from the point to a center point of the one allocated cluster is lower than a distance to a center point of any of the other clusters.

The multi-dimensional intensity distribution model is based upon a multi-dimensional Gaussian mixture model. The Gaussian distribution is a continuous probability distribution that is used as a first approximation to describe real valued random variables that tend to cluster around a single mean value. The graph of the associated probability density function is bell shaped (e.g., the Gaussian function or bell curve). The Gaussian function is represented by the following equation:

$$f(x) = \frac{1}{\sqrt{2\pi\sigma^2}} e^{-\frac{(x-\mu)^2}{2\sigma^2}} \quad (1)$$

where: $\mu$ is the mean representing the location of the peak of the curve, and $\sigma^2$ is the variance, which represents a measure of the width of the distribution.

The cluster in the multi-dimensional intensity distribution model is in the form of a Gaussian function or bell curve as mentioned in equation (1). As previously noted, the multi-dimensional intensity distribution model includes one or more clusters, and each of the one or more clusters is represented in the form of the Gaussian function. As an example, if the multi-dimensional intensity distribution model has two clusters, a first cluster has a mean as $\mu_1$, and a second cluster has a mean as $\mu_2$. A distance of a point from $\mu_1$ and $\mu_2$ is calculated. The point is allocated to the cluster, to which the distance is the least.

The distance is a Mahalanobis distance of each voxel intensity pair from the two MR images to the centers of the two clusters (e.g., the first cluster and the second cluster).

At act 208, the clusters that have been identified in act 206 are assigned into one or more tissue classes. The assignment of the clusters into the one or more tissue classes is based on correlated intensities of each of the clusters. The one or more tissue classes include bone, air, cerebrospinal fluid, and/or soft tissues. Based upon the correlated intensities, the clusters are classified as representative of a tissue class in the multi-dimensional intensity distribution model.

Additionally, a data model of the subject (e.g., the patient) is created. The data model may be segmented into one or more regions of different tissue classes. The data model of the subject includes voxels. The voxels in each region of the one or more regions of the data model correspond to the clusters in the multi-dimensional intensity distribution model. The data model is used to generate an image of the subject with different tissue classes highlighted in the image.

Figure 2:
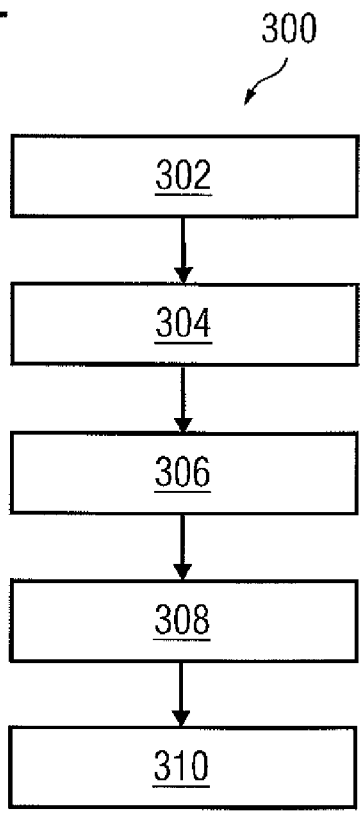
FIG. 2 is a flowchart illustrating another embodiment of a method of separating tissue classes in magnetic resonance images.

Referring to FIG. 2, a flowchart 300 illustrating another embodiment of the method of separating tissue classes in MR images is shown. At act 302, a plurality of MR images of the subject is acquired using different acquisition parameters. With reference to FIG. 1, two ultra short echo time (UTE) MR images having different echo time are acquired.

At act 304, background voxels and foreground voxels in the plurality of MR images of the subject are separated. The background voxels are voxels surrounding the subject, and the foreground voxels are body voxels of the subject. The background voxels and the foreground voxels in the plurality of MR images are separated using an Otsu filter.

At act 306, the plurality of MR images is normalized. The plurality of MR images acquired using UTE technique show intensity inhomogeneities that are to be corrected. Some MR images of the plurality may show signal decay in a particular direction (e.g., a caudal direction), while other MR images of the plurality may show irregular intensity inhomogeneities. The intensity inhomogeneities may be corrected using normalization. For the MR images of the plurality showing signal decay in a caudal direction, a slice-wise normalization that involves dividing each transversal slice of the image by a maximum intensity value may be carried out.

For MR images of the plurality showing irregular intensity inhomogeneities, homomorphic filtering is applied to the plurality of MR images, thereby correcting the intensity inhomogeneities.

At act 308, the separation of tissue classes in the plurality of MR images is performed as explained with reference to FIG. 1. A multi-dimensional intensity distribution model is generated from the plurality of MR images representing the distribution of the intensities of voxels in each MR image of the plurality. The multi-dimensional intensity distribution model is based on a multi-dimensional Gaussian mixture model and is fitted to a joint histogram for the plurality of MR images.

The clusters of correlated intensities in the multi-dimensional intensity distribution model are identified, and the clusters are assigned into one or more tissue classes based on the correlated intensities of each of the clusters, as explained with reference to FIG. 1.

Additionally, a tissue class of the one or more tissue classes may be separated from the remaining tissue classes of the one or more tissue classes by acquiring an additional MR image. The one or more tissue classes may include air, bone and cerebrospinal fluid. The cerebrospinal fluid may be separated from the remaining tissues by using an additional MR image sequence. For separating tissues such as air and bone, one MR image of the plurality may be masked, since air and bone are not separable. Both the tissue classes are represented by one or two clusters together in the multi-dimensional intensity distribution model.

At act 308, an image of the subject is displayed with different tissue classes highlighted.

Figure 3:
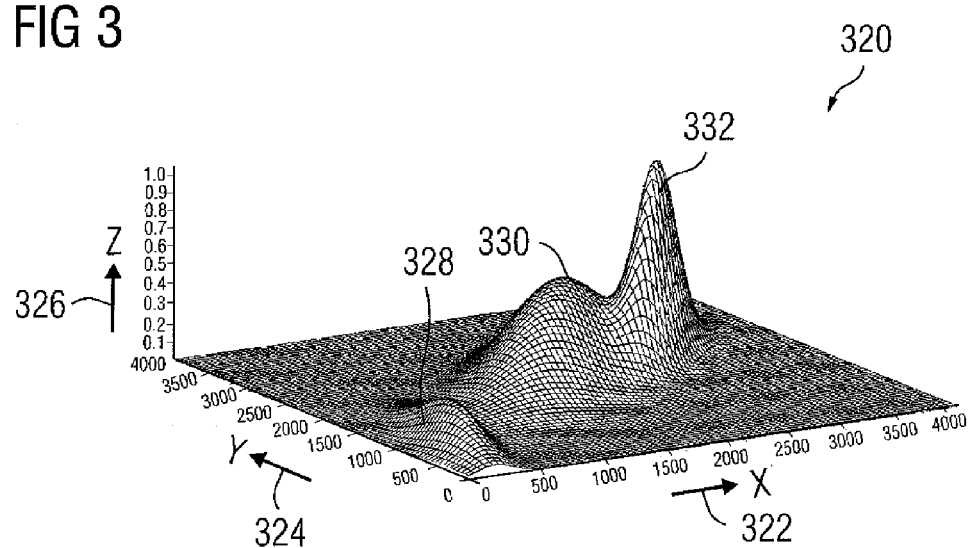
FIG. 3 illustrates a multi-dimensional intensity distribution model.

Referring to FIG. 3, a multi-dimensional intensity distribution model 320 is illustrated. The multi-dimensional intensity distribution model 320 is based on Gaussian mixture model (GMM). The multi-dimensional intensity distribution model is a joint histogram for the plurality of MR images.

The GMM is a two-dimensional model with the two axes (e.g., the X axis 322 and the Y axis 324) representing the intensity of corresponding voxels from the two MR images: the X-axis 322 for the first MR image and the Y-axis for the second MR image. The GMM may be estimated using an algorithm such as, for example, an expectation-maximization algorithm. Reference numeral 326 is representative of a Z-axis in the multi-dimensional intensity distribution model 320, indicating the probability that a certain combination of intensity values from the first image and the second image will occur for spatially corresponding image voxels. The GMM may also be extended to include more than two images. For example, if there are three images, the X, Y and Z axes may represent the three images, and the fourth axis may indicate a probability that a certain combination of intensity values from the three images occurs.

As illustrated in FIG. 3, the multi-dimensional intensity distribution model 320 contains one or more (e.g., three) clusters 328, 330, 332. The three clusters 328, 330, 332 represent different tissue classes. For example, a first cluster 328 is representative of bone, a second cluster 330 is representative of air, and a third cluster 332 is representative of cerebrospinal fluid.

Figure 4:
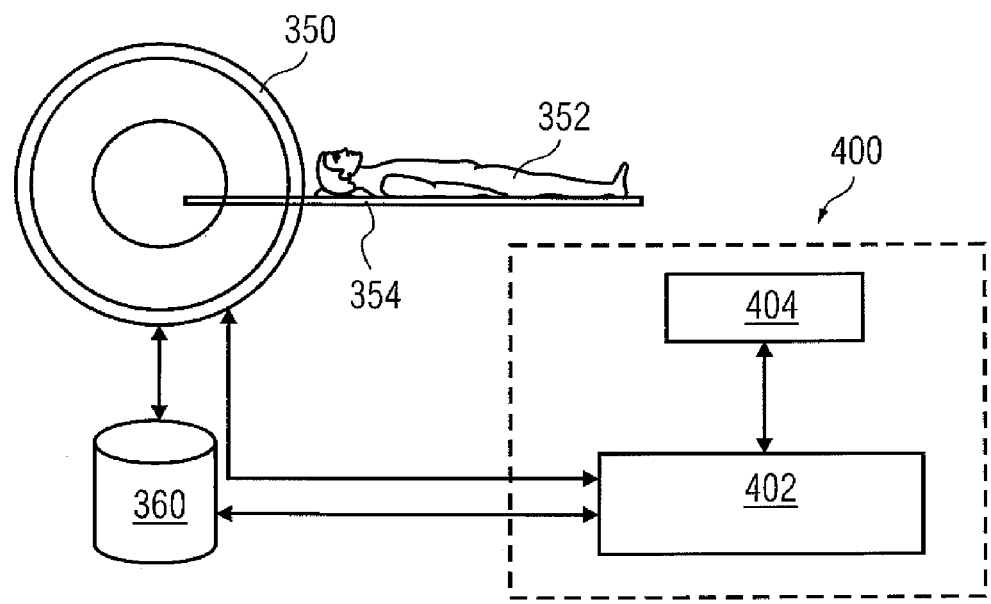
FIG. 4 shows one embodiment of a system for separating tissue classes in magnetic resonance images.

FIG. 4 is a schematic diagram of one embodiment of a system 400 for separating tissue classes in MR images. The system 400 is a computer with software applications running on the computer. The system 400 is connected to an MRI scanner 350 that includes a bed 354, on which the subject 352 (e.g., a patient) lies. The subject 352 is driven into the scanner 350 for acquiring MR images. The system 400 includes a processor 402 adapted to acquire a plurality of MR images of the subject 352 with different acquisition parameters, as mentioned with reference to FIG. 1. That the system 400 may be a stand-alone computer with software applications running on the stand-alone computer. Alternatively, the system 400 may be an integral part of the MRI scanner 350.

A data repository 360 is connected to the MRI scanner 350 to store MR image data. This MR image data is accessed by the processor 402 of the system 400 for further processing. The system 400 includes a display unit 404 to display the processed image of the subject 352. The display unit 404 is configured to display the image of the subject 352 with different tissue classes highlighted in the image. Alternatively, the image data may also be accessed from a picture archiving and communication system (PACS). In such an embodiment, the PACS may be coupled to a remote system such as a radiology department information system (RIS), a hospital information system (HIS) or an internal or external network, for example, so that image data may be accessed from different locations.

The processor 402 is configured to generate a multi-dimensional intensity distribution model from the plurality of MR images that are acquired using the UTE technique, as described with reference to FIGS. 1-3. The multi-dimensional intensity distribution model 320 (see FIG. 3) is displayed on the display unit 404. The processor 402 is further configured to identify clusters of correlated intensities in the multi-dimensional intensity distribution model and assign the clusters into one or more tissue classes based on the correlated intensities of each of the clusters.

The processor 402 is configured to create a data model of the subject 352. The data model is segmented into one or more regions of different tissue classes, such that voxels in each of the regions corresponds to the cluster in the multi-dimensional intensity distribution model.

The exemplary method and the system for separating tissue classes in MR images, as described above, has several advantages. The method is fully automatic and may also improve accuracy in RT planning for certain indication such as, for example, existence of high-Z implants or for planning in low soft-tissue contrast regions where MR data is used when rigid fusion yields allows MRI and CT to be overlayed, which is not often the cases in real clinical practice. The methods of the present embodiments provide for directly planning the treatment based on the MR image.

Although the invention has been described with reference to specific embodiments, this description is not to be construed as limiting. Various modifications of the disclosed embodiments, as well as alternate embodiments of the invention, are apparent to persons skilled in the art upon reference to the description of the invention. It is therefore contemplated that such modifications can be made without departing from the embodiments as defined.

The invention claimed is:

1. A method for directly planning a treatment based on a magnetic resonance image, the method comprising:
    acquiring a plurality of magnetic resonance images of a subject with different acquisition parameters;
    normalizing at least some magnetic resonance images of the plurality of magnetic resonance images, the normalizing comprising:
        for magnetic resonance images of the plurality of magnetic resonance images showing irregular intensity inhomogeneities, applying homomorphic filtering to the magnetic resonance images; and
        for magnetic resonance images of the plurality of magnetic resonance images showing signal decay in a caudal direction, applying a slice-wise normalization to the magnetic resonance images, the applying of the slice-wise normalization comprising dividing each transversal slice of the magnetic resonance image by a maximum intensity value;
    separating tissue classes in magnetic resonance images, the separating comprising:
        generating a multi-dimensional intensity distribution model from the plurality of magnetic resonance images, the multi-dimensional intensity distribution model representing a distribution of intensities of voxels in each magnetic resonance image of the plurality, wherein the multi-dimensional intensity distribution model is or is fitted to a joint histogram for the plurality of magnetic resonance images;
        identifying clusters of correlated intensities in the multi-dimensional intensity distribution model;

assigning the clusters into one or more tissue classes based on the correlated intensities of each of the clusters; and creating a data model of the subject, wherein the data model is segmented into one or more regions of different tissue classes, such that voxels in each region of the one or more regions corresponds to the clusters in the multi-dimensional intensity distribution model; and calculating dose distribution for the subject based on the created data model of the subject.

2. The method according to claim 1, wherein the multi-dimensional intensity distribution model is based on a multi-dimensional Gaussian mixture model.

3. The method according to claim 1, wherein identifying clusters comprises allocating a point in the multi-dimensional intensity distribution model to a cluster, such that a distance from the point to a center point of the allocated cluster is lower than a distance to a center point of any other cluster.

4. The method according to claim 1, further comprising:
generating an image of the subject based on the data model; and
displaying the image of the subject,
wherein the different tissue classes in the image are highlighted.

5. The method according to claim 1, wherein two magnetic resonance images of the subject with different acquisition parameter are acquired.

6. The method according to claim 1, wherein the different acquisition parameters comprise ultra short echo time sequences.

7. The method according to claim 1, wherein the one or more tissue classes comprise bone, air and cerebrospinal fluid.

8. The method according to claim 1, further comprising pre-processing the plurality of magnetic resonance images to separate background voxels and foreground voxels in the plurality of magnetic resonance images of the subject.

9. The method according to claim 8, wherein the background voxels and the foreground voxels are separated using an Otsu filter.

10. The method according to claim 1, further comprising normalizing the plurality of magnetic resonance images.

11. The method according to claim 10, wherein normalizing the plurality of magnetic resonance images comprises applying homomorphic filtering to the plurality of magnetic resonance images.

12. The method according to claim 1, further comprising acquiring an additional magnetic resonance image to separate a tissue class of the one or more tissue classes from the remaining tissue classes of the one or more tissue classes.

13. A system for directly planning a treatment based on a magnetic resonance image, the system comprising:
a processor configured to:
acquire a plurality of magnetic resonance images of a subject with different acquisition parameters;
normalize at least some magnetic resonance images of the plurality of magnetic resonance images, the normalization comprising:
for magnetic resonance images of the plurality of magnetic resonance images showing irregular intensity inhomogeneities, application of homomorphic filtering to the magnetic resonance images; and
for magnetic resonance images of the plurality of magnetic resonance images showing signal decay in a caudal direction, application of a slice-wise normalization to the magnetic resonance images, the application of the slice-wise normalization comprising division of each transversal slice of the magnetic resonance image by a maximum intensity value;
separate tissue classes in magnetic resonance images, the separation of the tissue classes comprising:
generation of a multi-dimensional intensity distribution model from the plurality of magnetic resonance images, the multi-dimensional intensity distribution model representing a distribution of intensities of voxels in each magnetic resonance image of the plurality, wherein the multi-dimensional intensity distribution model is or is fitted to a joint histogram for the plurality of magnetic resonance images;
identification of clusters of correlated intensities in the multi-dimensional intensity distribution model;
assignment of the clusters into one or more tissue classes based on the correlated intensities of each of the cluster; and
creation of a data model of the subject, wherein the data model is segmented into one or more regions of different tissue classes, such that voxels in each region of the one or more regions corresponds to the clusters in the multi-dimensional intensity distribution model; and
calculate dose distribution for the subject based on the created data model of the subject.

14. The system according to claim 13, further comprising a display unit configured to display an image of the subject with the different tissue classes.

15. The system according to claim 13, wherein the plurality of magnetic resonance images are acquired using an ultra short echo time technique.

16. The system according to claim 13, wherein the processor is further configured to allocate a point in the multi-dimensional intensity distribution model to one of the clusters, such that a distance from the point to a center point of the one allocated cluster is lower than a distance to a center point of any other cluster.

17. In a non-transitory computer readable medium comprising computer readable instructions that, when executed by a processor, causes the processor to directly plan a treatment based on a magnetic resonance image, the instructions comprising:
acquiring a plurality of magnetic resonance images of a subject with different acquisition parameters;
generating a multi-dimensional intensity distribution model from the plurality of magnetic resonance images, the multi-dimensional intensity distribution model representing a distribution of intensities of voxels in each magnetic resonance image of the plurality, wherein the multi-dimensional intensity distribution model is or is fitted to a joint histogram for the plurality of magnetic resonance images;
identifying clusters of correlated intensities in the multi-dimensional intensity distribution model;
assigning the clusters into one or more tissue classes based on the correlated intensities of each of the clusters;
creating a data model of the subject, wherein the data model is segmented into one or more regions of different tissue classes, such that voxels in each region of the one or more regions corresponds to the clusters in the multi-dimensional intensity distribution model;

normalizing at least some magnetic resonance images of the plurality of magnetic resonance images, the normalizing comprising:

for magnetic resonance images of the plurality of magnetic resonance images showing irregular intensity inhomogeneities, applying homomorphic filtering to the magnetic resonance images; and for magnetic resonance images of the plurality of magnetic resonance images showing signal decay in a caudal direction, applying a slice-wise normalization to the magnetic resonance images, the applying the slice-wise normalization comprising dividing each transversal slice of the magnetic resonance image by a maximum intensity value; and calculating dose distribution based on the created data model of the subject.

18. The method according to claim 1, wherein the different acquisition parameters comprise repetition times, sampling bandwidths, scanning times, or scanning ranges.

19. The method according to claim 1, further comprising:

separating background voxels and foreground voxels in the plurality of magnetic resonance images; and normalizing at least some magnetic resonance images of the plurality of magnetic resonance images.

\* \* \* \* \*